(12) United States Patent
Hassell (10) Patent No.: US 11,827,137 B1
(45) Date of Patent: Nov. 28, 2023

(54) TOW DOLLY CROSS RAIL ASSEMBLY WITH POSITIVE CAMBER

(71) Applicant: Curtis Collins Hassell, Medford, OR (US)

(72) Inventor: Curtis Collins Hassell, Medford, OR (US)

( * ) Notice: Subject to any disclaimer, the term of this patent is extended or adjusted under 35 U.S.C. 154(b) by 651 days.

(21) Appl. No.: 17/085,892

(22) Filed: Oct. 30, 2020

Related U.S. Application Data (60) Provisional application No. 63/058,949, filed on Jul. 30, 2020.

(51) Int. Cl.
*B60P 3/00* (2006.01)
*B60P 3/12* (2006.01)
*B62D 63/06* (2006.01)

(52) U.S. Cl.
CPC ............ *B60P 3/127* (2013.01); *B62D 63/061* (2013.01)

(58) Field of Classification Search
CPC ....... B62D 21/14; B62D 63/061; B60P 3/127; B60P 3/122; B60P 3/00; B62B 2202/90; B62B 5/0083; B60B 30/10; B60B 2900/212
USPC ........................................................ 280/656
See application file for complete search history.

(56) References Cited

U.S. PATENT DOCUMENTS

| | | | | |
|---|---|---|---|---|
| 2,885,090 | A * | 5/1959 | Forman | A47F 7/24 211/175 |
| 2,940,769 | A | 6/1960 | Taylor | |
| 4,412,699 | A * | 11/1983 | Peruzzi | B62D 33/02 298/17 R |
| 4,934,720 | A * | 6/1990 | Dobron | B62B 5/0083 108/56.1 |
| 5,249,823 | A * | 10/1993 | McCoy | B62B 3/02 280/87.01 |
| 5,326,128 | A * | 7/1994 | Cromley, Jr. | B60G 3/145 301/128 |
| 5,599,031 | A * | 2/1997 | Hodges | B62B 5/0083 280/35 |
| 6,612,601 | B1 * | 9/2003 | Granlind | B60P 3/1091 280/42 |
| 6,824,152 | B1 * | 11/2004 | Scott | B62B 3/02 280/43.16 |
| 7,111,854 | B1 * | 9/2006 | Tuthill | B62D 63/06 280/789 |
| 7,869,350 | B1 | 3/2011 | Buma | |
| 8,360,474 | B2 | 1/2013 | Lurie | |

(Continued)

*Primary Examiner* — James A Shriver, II
*Assistant Examiner* — Hilary L Johns
(74) *Attorney, Agent, or Firm* — Jerry Haynes Law (57) ABSTRACT

A tow dolly cross rail assembly includes a male bar and a pair of female bars arranged in a slidable relationship, forming an arched configuration that creates a positive camber effect at dolly tires at the outer ends of the bars. The male bar comprises an apex that forms an angle that orients upwardly, forming an angle between about 165° to 179°. The center male bar and pair of female bars are arranged in a slidable relationship with each other. The midpoint of the center male bar forms an apex. The inner end of female bars is in a slidable relationship with free ends of center male bar. The female bars telescopically slide along the free ends of center male bar for increasing and decreasing length of cross rail. The arched configuration of the center male bar slopes the female bars to create a positive camber at the dolly tires.

19 Claims, 9 Drawing Sheets

(56) References Cited

U.S. PATENT DOCUMENTS

| | | | |
|---|---|---|---|
| 9,358,836 B2* | 6/2016 | David | B60B 35/10 |
| 10,035,445 B2* | 7/2018 | Sharp | B60P 3/122 |
| 11,117,608 B2* | 9/2021 | Turner, Jr. | B62B 5/0093 |
| 2010/0148475 A1* | 6/2010 | Serre | B62D 63/061 |
| | | | 280/656 |
| 2013/0300097 A1* | 11/2013 | Garceau | B62D 27/023 |
| | | | 280/789 |
| 2015/0210115 A1* | 7/2015 | David | B60B 35/10 |
| | | | 301/128 |
| 2018/0056838 A1* | 3/2018 | Sharp | B60P 1/025 |
| 2022/0185403 A1* | 6/2022 | Listro | B63C 13/00 |

* cited by examiner

TOW DOLLY CROSS RAIL ASSEMBLY WITH POSITIVE CAMBER

CROSS-REFERENCE TO RELATED APPLICATION(S)

This application claims the benefits of U.S. provisional application No. 63/058,949, filed Jul. 30, 2020 and entitled POSITIVE CAMBERED CROSS RAIL FOR TOW DOLLY, which provisional application is incorporated by reference herein in its entirety.

FIELD OF THE INVENTION

The present invention relates generally to a tow dolly cross rail assembly with positive camber. More so, the present invention relates to a positive cambered cross rail that has an arched configuration that creates a positive camber effect at a pair of dolly tires at the outer end of the cross rail, which increases stability during towing operations and reduces tire and bearing wear.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, tow truck operators utilize tow dollies for towing a vehicle. Such a tow dolly is usually an unpowered dolly designed for connection to a truck, tow truck, tractor unit, or prime mover vehicle with strong traction power. The tow dolly can include an SL-type tow dolly, an SLX-type tow dolly, and an SLZ-type tow dolly that carry either the front or rear vehicle tires during towing. This type of tire support allows the other vehicle tires to be lifted and towed by the tow truck.

The tow dolly utilizes cross rails and support tubes that cross each other at an orthogonal to support the weight of the vehicle. The cross rails are sufficiently rated, so as to support wide, heavy vehicles. Under such weight, the cross rails are susceptible to sagging in the center section however. This sagging effect creates a negative camber tire alignment, in which the top of the tire extending inwardly, and the base of the tire extending outwardly.

It is also significant to note that vehicles vary in size, shape, and weight. These variable dimensions require the cross rails of the tow dolly to be length adjustable, so as to accommodate the different vehicles.

Another problem with the prior art tow dolly is dynamic shock loading. When the tow dolly is motionless, the weight of the vehicle is static. But when the tow dolly is in motion while towing the vehicle, dynamic forces come into play as the vehicle's suspension causes the vehicle to rise and fall directly onto the tow dolly, and specifically on the cross rails. This is especially problematic on rough road surfaces. Consequently, if a vehicle load is at full capacity from a static position, then during towing, the load capacity would increase beyond the maximum.

Other proposals have involved tow dolly assemblies for towing vehicles. The problem with these tow dollies is that they sag in the middle section, and the tires wear at their edges because of the sloped configuration from sagging. Also, the cross rail may not be length adjustable to accommodate different sized tire bases. Even though the above cited tow dolly assemblies meet some of the needs of the market, a tow dolly cross rail assembly with positive camber that has an arched configuration that creates a positive camber effect at a pair of dolly tires at the outer end of the cross rail, which increases stability during towing operations and reduces tire wear, is still desired.

SUMMARY

Illustrative embodiments of the disclosure are generally directed to a tow dolly cross rail assembly with positive camber. The tow dolly cross rail assembly includes a center male bar and a pair of outer female bars arranged in a slidable relationship, and forming a unique arched configuration that creates a positive camber effect at a pair of dolly tires at the outer end of the female bars. This camber-effect is possible because the male bar comprises an apex at the midpoint. The apex forms an angle that orients upwardly and away from a ground surface, forming an angle between about 165° to 179°. The positive camber of the dolly tires creates numerous advantageous for towing a vehicle with the tow dolly, as described below.

In some embodiments, the assembly comprises at least one cross rail having a center male bar and a pair of outer female bars arranged in a slidable relationship. The center male bar is defined by a longitudinal and a pair of free ends. The approximate midpoint of the center male bar forms an apex along the longitudinal of the center male bar. In this manner, the center male bar is defined by an arched configuration.

The pair of outer female bars are defined by an inner end and an outer end. The inner end of the female bars is disposed in a slidable arrangement with the free ends of the center male bar. Consequently, the outer female bars telescopically slide along the free ends of the center male bar for selectively increasing and decreasing length of the cross rail. Consequently, the arched configuration of the center male bar slopes the outer female bars downward relative to a horizontal plane.

In another aspect, at least one cross rail comprises a front cross rail and a rear cross rail.

In another aspect, the center male bar is defined by multiple male fastening holes.

In another aspect, the female bars are defined by multiple female fastening holes.

In another aspect, the assembly also provides one or more plunger pins operable to pass through the male and female fastening holes when aligned.

In another aspect, the plunger pins comprise a spring-loaded plunger.

In another aspect, the female bars are defined by an elongated square shape.

In another aspect, the assembly also provides a pair of greaseless-bearing inserts operatively joined with the outer end of the female bars.

In another aspect, the assembly also provides a pair of support tubes disposed in a parallel spaced apart relationship, and joined at an orthogonal to the outer end of the female bars.

In another aspect, the outer end of the female bars comprises a mount plate angled slightly outward for attachment to the support tubes.

In another aspect, the assembly also provides a spindle and bushing subassembly joined at the junction of the support tubes and the female bars.

In another aspect, the assembly also provides a plurality of dolly tires rotatably joined with the spindle and bushing subassembly.

In another aspect, the spindle and bushing subassembly facilitate rotation of the dolly tires.

In another aspect, the downward sloped configuration of the female bars relative to the horizontal plane orients the dolly tires at a positive camber.

In another aspect, the apex forms an angle in the center male bar, the angle oriented upwardly and away from a ground surface.

In another aspect, the angle formed in the center male bar being between about 165° to 179°.

One objective of the present invention is to create a positive camber to the dolly tires for a tow dolly.

Another objective is to slope the female bars of a cross rail so as to create a positive camber-effect in the dolly tires.

Another objective is to support the weight of large, heavy vehicles on a tow dolly, while also preventing the tops of the two dolly sides from leaning in towards the vehicle.

Another objective is to maintain the dolly sides and dolly tires vertical.

Another objective is to eliminate sag under cross rails while under heavy weight from the vehicle.

Yet another objective is to prevent the cross rail from dragging the ground under heavy weight.

Yet another objective is to variably adjust the length of the cross rail by telescopically sliding the female bars relative to the center male bar.

Another objective is to provide an inexpensive way to manufacture a tow dolly cross rail assembly with positive camber.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A tow dolly cross rail assembly with positive camber is referenced in FIGS. 1-10. The tow dolly cross rail assembly 100, hereafter "assembly 100", helps orient a pair of tow dolly tires 118*a*, 118*b* at a positive camber 500 through use of an arched cross rail 102*a-b* that orients the ends of the cross rail at a slope. The downward slope creates a positive camber effect at the dolly tires 118a-d, which increases stability during towing operations and reduces tire wear.

Figure 1:
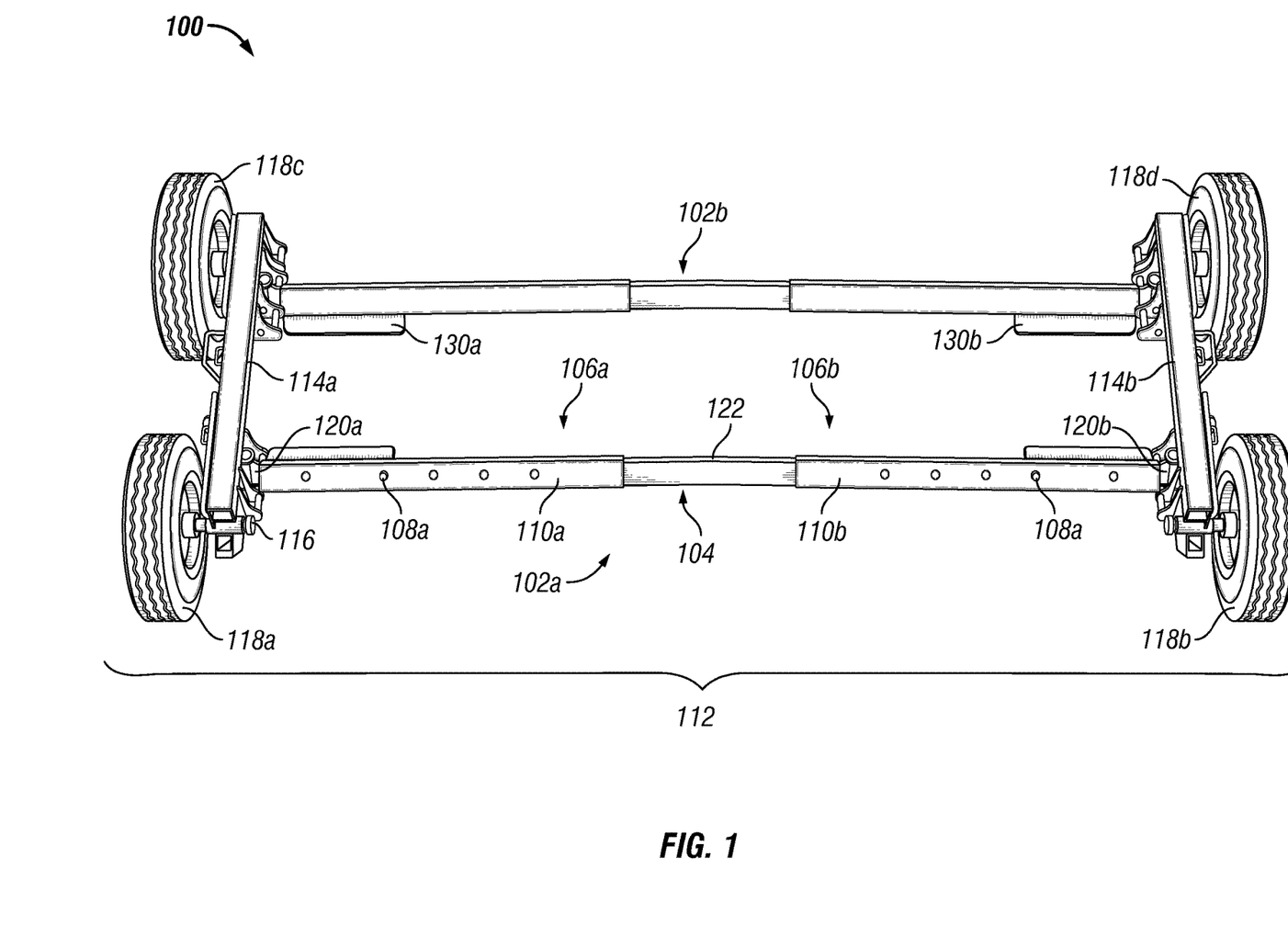
FIG. 1 illustrates an upper perspective view of an exemplary tow dolly cross rail assembly with positive camber, in accordance with an embodiment of the present invention.

As referenced in FIG. 1, the assembly 100 includes a center male bar 104 and an outer pair of female bars 106a, 106b. The outer female bars 106a-b are arranged in a slidable relationship with the center male bar 104. The center male bar 104 has an elongated longitudinal 200 defined by a midpoint 202 that forms an apex 122. The apex 122 forms an angle 204 that orients upwardly, and away from a ground surface 504. In one possible embodiment, the angle 204 is approximately between 165° to 179°, which creates an arched configuration for the central male bar 104. The arched configuration causes the slidably connected female bars 106a-b to slope downwardly, towards the ground surface 504. This downward slope by the outer female bars creates a positive camber effect at the dolly tires 118a-d, which are operatively coupled to the outer end of the female bars 106a-b.

Figure 5:
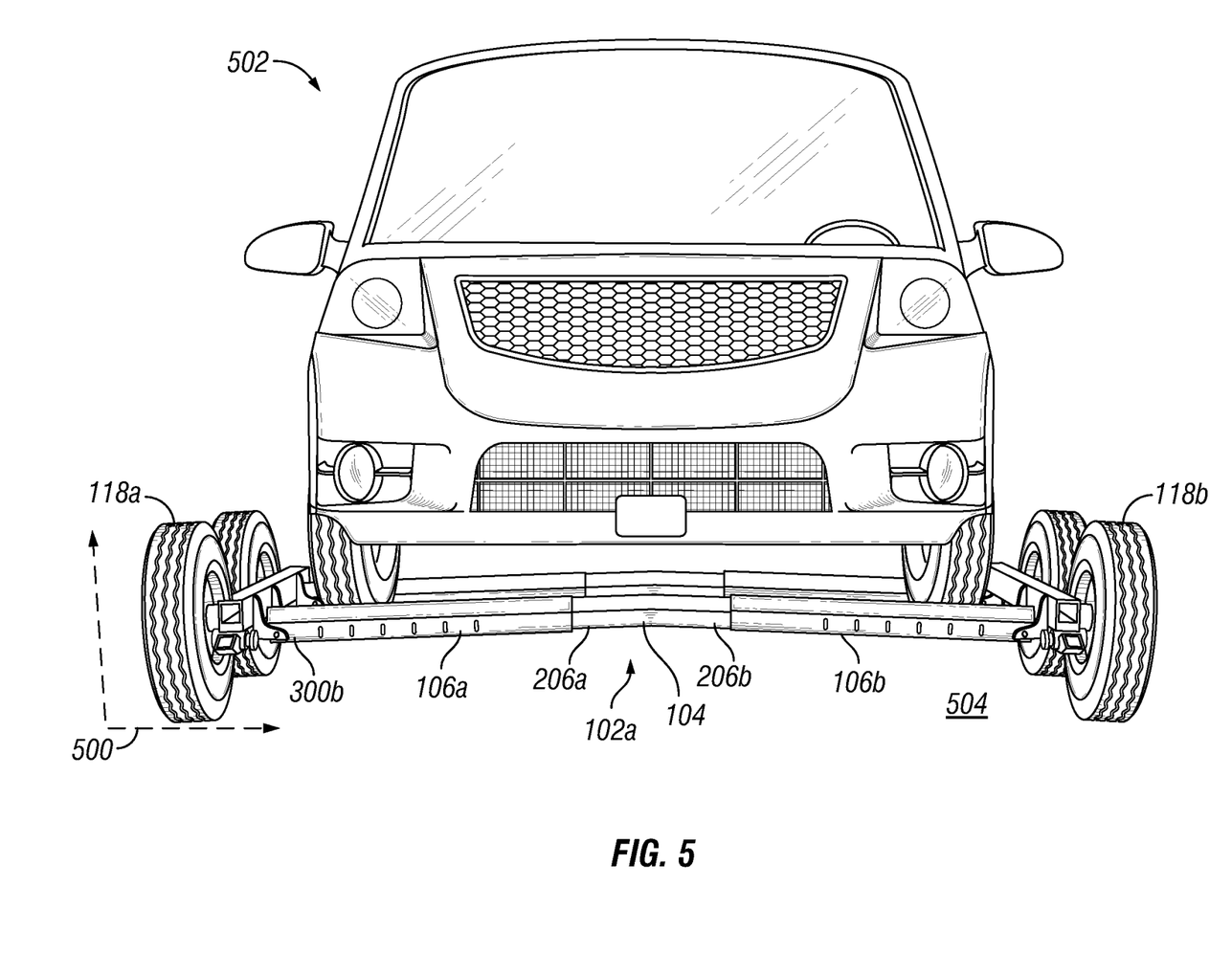
FIG. 5 illustrates a close-up view of the center male bar joined at the free ends, and forming a positive camber at the dolly tires, in accordance with an embodiment of the present invention.

For purposes of the present invention, a positive camber is defined as the top of the dolly tire extending outwardly from the male center bar 104, and the base of the tire extending inwardly (See FIG. 5). This camber creates a slightly tilted orientation for the plurality of dolly tires 118a, 118b, 118c, 118d at the ends of the cross rails 102a, 102b. As is known in the art, the positive camber 500 of the dolly tires 118a-d creates numerous advantageous for towing a vehicle 502 with the tow dolly 112, as described below.

As FIG. 1 shows, the assembly 100 comprises at least one cross rail 102a-b. The cross rail may include a center male bar 104 and an outer pair of female bars 106a-b joined in a telescopically slidable relationship. The cross rail 102a-b is part of the supportive framework of a tow dolly 112, traversing the tow dolly 112, and carrying the front, rear, or front and rear tires of the vehicle 502 being towed.

In some embodiments, at least one cross rail 102a-b comprises one front cross rail 102a-b and one rear cross rail 102a-b. A front cross rail 102a is disposed proximal to the front end of the tow dolly 112, or where the vehicle 502 is supported on the tow dolly. A rear cross rail 102b is disposed proximal to the rear end of the tow dolly 112. In one exemplary embodiment of at least one cross rail, two cross rails 102a, 102b are utilized to traverse the front and rear ends of the tow dolly 112. The two cross rails are disposed in a parallel, spaced-apart relationship, so as to support the front and/or rear tires of the vehicle 502.

In yet other embodiments, the tow dolly 112 is an SLZ-type tow dolly that carry either the front or rear vehicle tires during towing. In any case, the cross rails 102a-b creates a positive camber 500 effect at the dolly tires 118a-d. For example, FIG. 5 illustrates an exemplary positive camber at the dolly tires 118a-b.

In another embodiment of the tow dolly 112, also described below, the outer ends of the cross rails 102a-b fixedly join with a pair of parallel, spaced-apart support tubes 114a, 114b that run along the longitudinal of the tow dolly 112. The cross rails 102a-b may also include a pair of mount plates 120a, 120b that join with the support tubes 114a-b at a spindle and bushing subassembly 116 (See FIG. 7). The mount plates 120a-b enhance the integrity of the attachment between female bars and support tubes 114a-b with a slightly outward angle from vertical, thereby improving the positive camber aspect of the cross rail. The spindle and bushing subassembly 116 are configured to facilitate rotation of the dolly tires 118a-d. In any case, the present invention includes, both, the cross rails 102a-b independent of other tow dolly 112 components; and the entire tow dolly 112, including the cross rail 102a-b.

Figure 2:
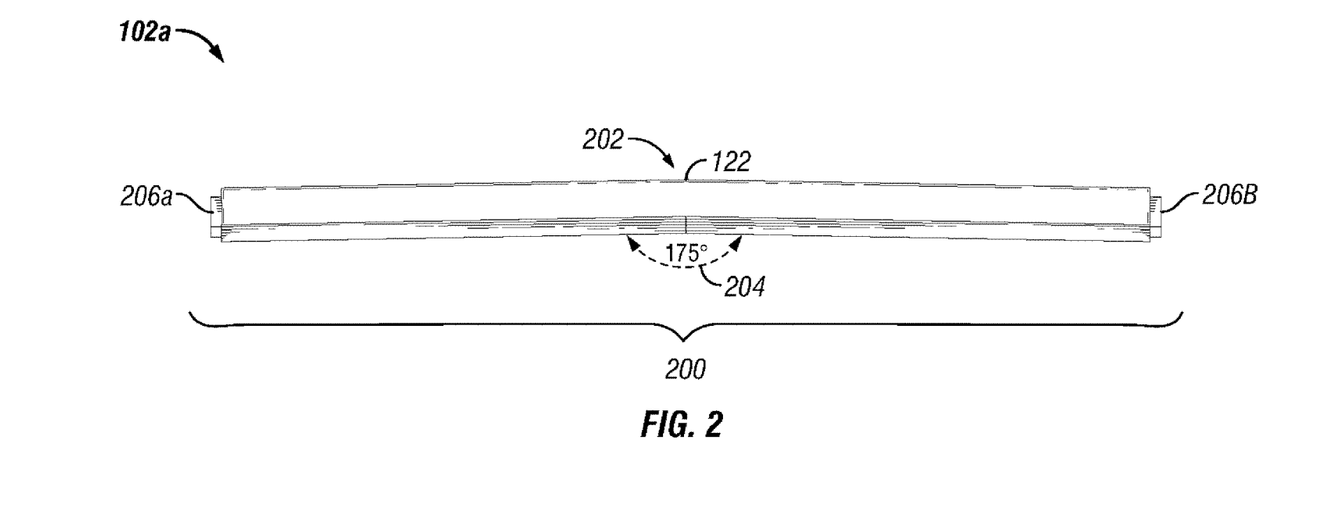
FIG. 2 illustrates a perspective view of an exemplary center male bar, in accordance with an embodiment of the present invention.

Looking now at the center male bar 104 shown in FIG. 2, an elongated longitudinal 200 defined the center male bar 104. In one non-limiting embodiment, the longitudinal 200 is elongated, and slightly arched. The approximate midpoint 202 of the center male bar 104 forms an apex 122 along the longitudinal 200. The longitudinal 200 of the center male bar 104 is also configured to terminate at a pair of free ends 206a, 206b. The free ends 206a-b of the center male bar 104 slope downwardly towards the ground surface 504, away from the apex 122.

Figure 7:
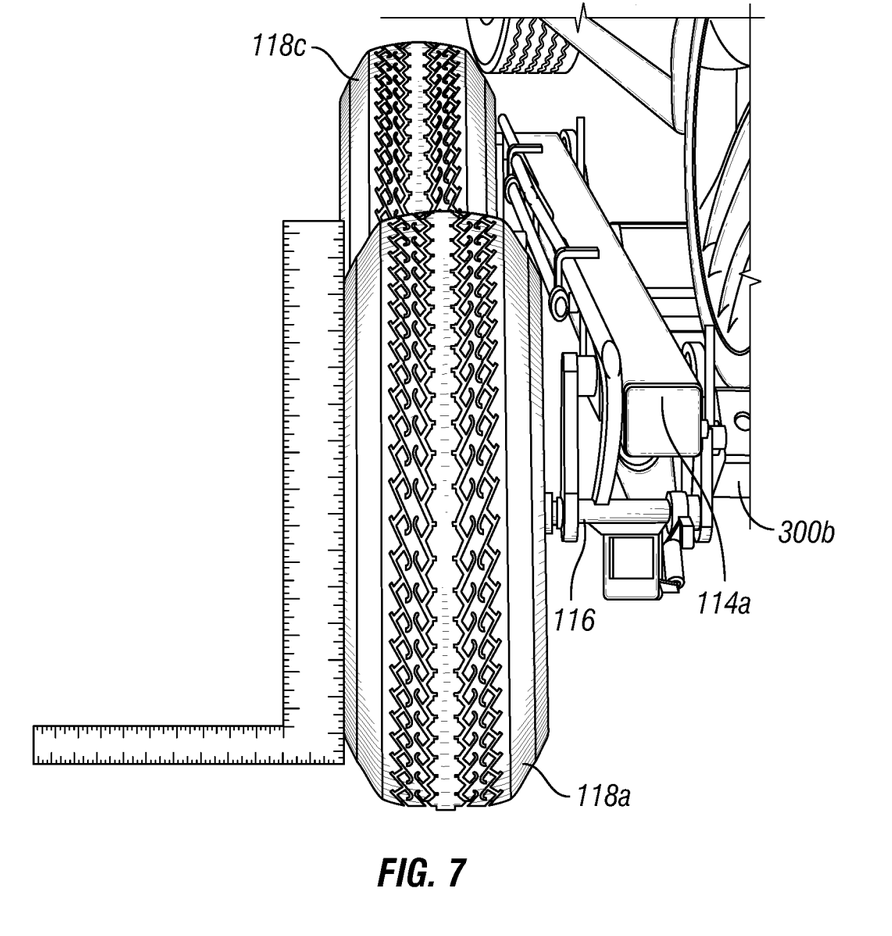
FIG. 7 illustrates a front perspective view of the support tubes holding the tires vertical while in a static motion, in accordance with an embodiment of the present invention.

In this manner, the center male bar 104 is defined by an arched configuration. The apex 122 at the center male bar 104 may be angular, or may be formed as a gradual curve. Advantageously, the arched configuration of the center male bar 104 is effective to support the weight of the large, heavy vehicle 502 on the tow dolly 112, while also preventing the tops of the two dolly sides from leaning in towards the vehicle 502. As shown in FIG. 7, this weight-balance relationship serves to maintain the dolly tires 118a-d at a substantially vertical position.

In some embodiments, the center male bar 104 is defined by multiple male fastening holes 108a, 108b. The male fastening holes 108a-b are sized and dimensioned to enable passage of one or more plunger pins 600, bolt, or other fastening mechanism used to fasten opposing telescoping bars together at a desired length through their respective fastening holes. Suitable materials for the center male bar 104 may include, without limitation, aluminum, steel, iron, metal alloys, carbon fibers, polymers, and combinations thereof. In one non-limiting embodiment, the center male bar 104 may be defined by an elongated square cross-section. In other embodiments, rectangular, multi-faceted, cylindrical, or triangular cross-sectional shapes may also be used.

Figure 3:
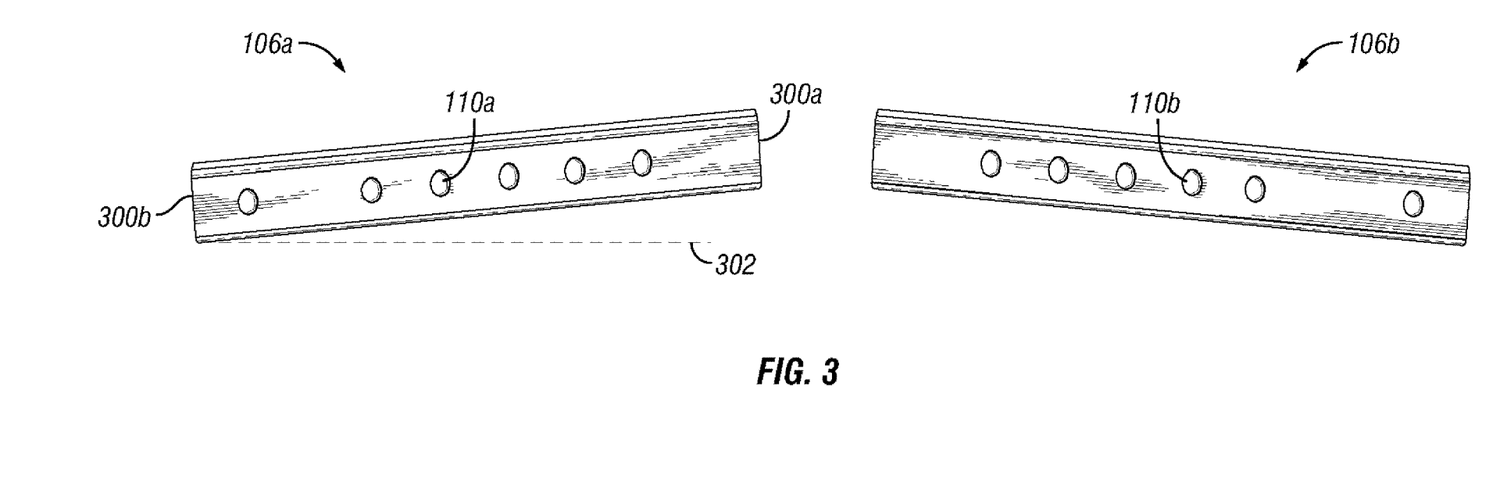
FIG. 3 illustrates a perspective view of an exemplary pair of female bars, in accordance with an embodiment of the present invention.

In addition to the center male bar 104, the cross rail 102a-b includes a complimentary pair of female bars 106a-b. As illustrated in FIG. 3, the pair of female bars 106a-b are defined by an inner end 300a that orients towards the center male bar 104; and an outer end that orients towards the dolly tires 118a-d. In one non-limiting embodiment, the female bars 106a-b are defined by an elongated square shape. In other embodiments, the female bars 106a-b can be rectangular, multi-faceted, cylindrical, or triangular. The female bars 106a-b may also be hollow in the middle to enable passage of the center male bar 104.

The inner end 300a of the female bars 106a-b receive the free ends 206a-b of the male bar. The outer female bars 106a, 106b may also have a larger diameter than the center male bar 104, so as to enable slidable passage of the male bar into the female bars 106a-b. In this manner, the female bars 106a-b telescopically slide along the ends of the center male bar 104, which serves to increase or decrease the overall length of the cross rail 102a-b.

The inner end 300a of the female bars 106a-b is disposed in a slidable arrangement with the free ends 206a-b of the center male bar 104. Consequently, the female bars 106a-b telescopically slide along the free ends 206a-b of the center male bar 104 for selectively increasing and decreasing the length of the cross rail 102a-b. The female bars 106a-b can slide along the longitudinal 200 of the center male bar 104, to adjust for differently sized vehicles being towed on the tow dolly 112.

In operation, the female bars 106a-b axially slide to a desired position relative to the center male bar 104 to adjust for differently sized vehicles. Extending the female bars 106a-b out from the center male bar 104 forms a longer cross rail 102a-b. Retracting the female bars 106a-b towards the center male bar 104 forms a shorter cross rail 102a-b. This allows the cross rail 102a-b to be manually shortened to a shorter length to carry lighter, narrower vehicles; and manually lengthened to a wider length to support wider, heavier vehicles during towing. It is significant to note that adjusting the cross rail 102a-b to have a wider or narrower length helps reduce shock load effects from the dynamic motion of the vehicle 502 being towed.

Figure 4:
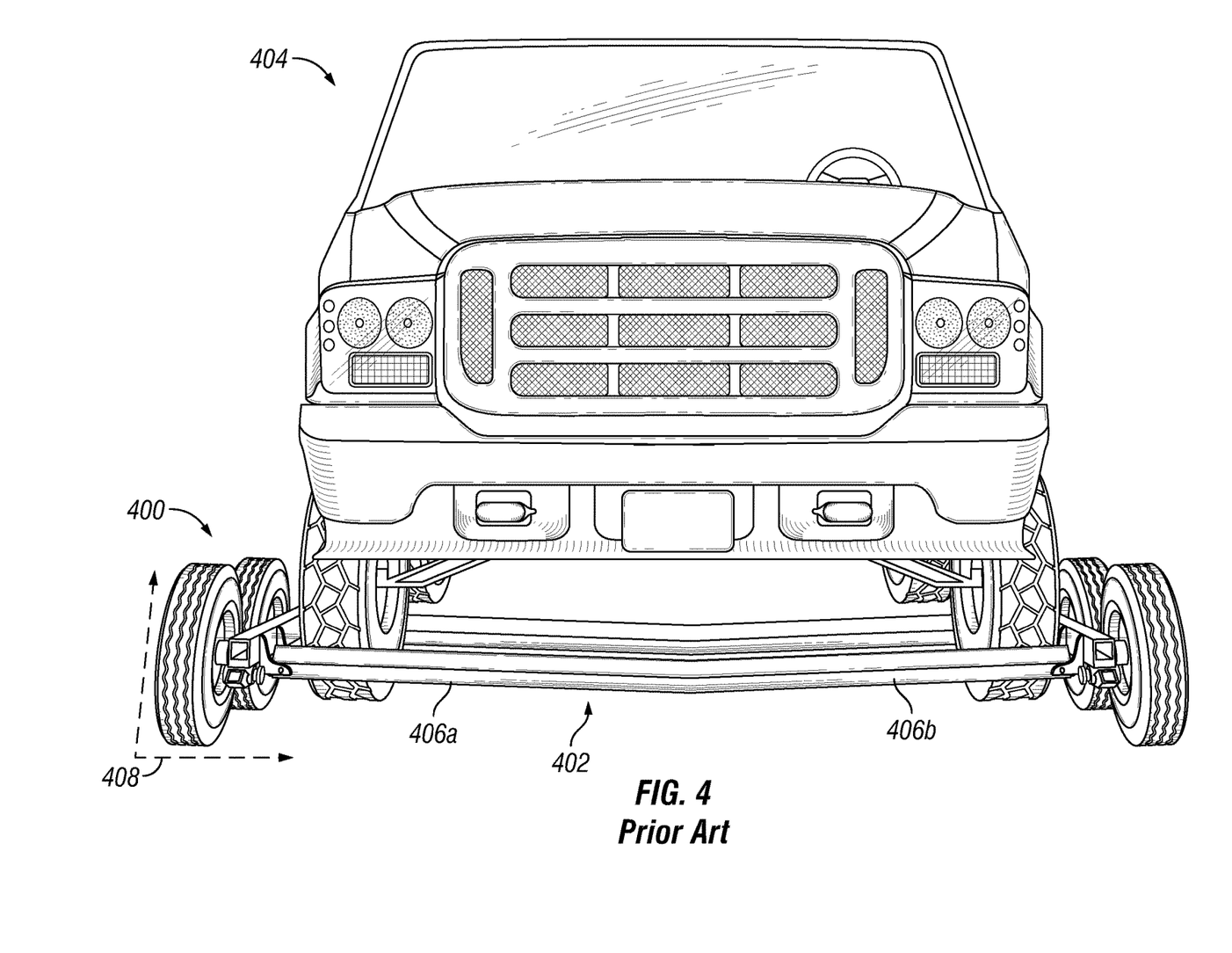
FIG. 4 illustrates a front perspective view of a prior art cross rail on a prior art tow dolly supporting a vehicle, in accordance with an embodiment of the present invention.

Looking now at a prior art tow dolly 400, FIG. 4 illustrates the prior art tow dolly 400 as having front and rear cross rails 402 that sag in the middle under the weight of the vehicle 404. As illustrated, the center section of prior art cross rails 402 for a prior art tow dolly 400 sags under the weight of a truck. This sagging effect creates a negative camber tire alignment 408, in which the top of the tire leaning inwardly, and the base of the tire extending outwardly. Also, the prior art cross rails 402 consists of two sections 406a, 406b that telescopically slide to accommodate different sizes of tire bases for the vehicle 404.

Another problem with the prior art tow dolly 400 is dynamic shock loading. When the tow dolly is motionless, the weight of the vehicle is static. But when the tow dolly is in motion while towing the vehicle, dynamic forces come into play as the vehicle's suspension causes the vehicle to rise and fall directly onto the tow dolly, and specifically on the prior art cross rails 402. This is especially problematic on rough road surfaces. Consequently, if a vehicle load is at full capacity from a static position, then during towing, the load capacity would increase beyond the maximum. Unlike the cross rails 402 for the prior art tow dolly 400, however, the arched configuration of the positive cambered cross rail 102a-b helps deflect this dynamic load excess during motion.

Looking outwardly, the outer end 300b of the female bars 106a-b joins with the support tubes 114a. And the attached spindle and bushing subassembly 116 facilitates rotation of the dolly tires 118a-d. The curve of the center male bar 104 orients the female bars 106a-b at a slightly downward slope, such that the dolly tires 118a-b, attached to the support tubes 114a-b, are at a positive camber 500 (See FIG. 5). Consequently, the arched configuration of the center male bar 104 slopes the female bars 106a-b downward, relative to a horizontal plane 302.

In some embodiments, the female bars 106a-b are defined by multiple female fastening holes 110a, 110b. The female fastening holes 110a-b are sized and dimensioned to enable passage of a plunger pin, bolt, or other fastening mechanism used to fasten opposing telescoping bars together at a desired length through their respective fastening holes. For example, the first male fastening hole 108a is aligned with the third female fastening hole 110b to achieve a longer cross rail 102a-b. One or more plunger pins 600, described below, may then pass through the aligned fastening holes to secure the bars at the desired length.

Figure 6:
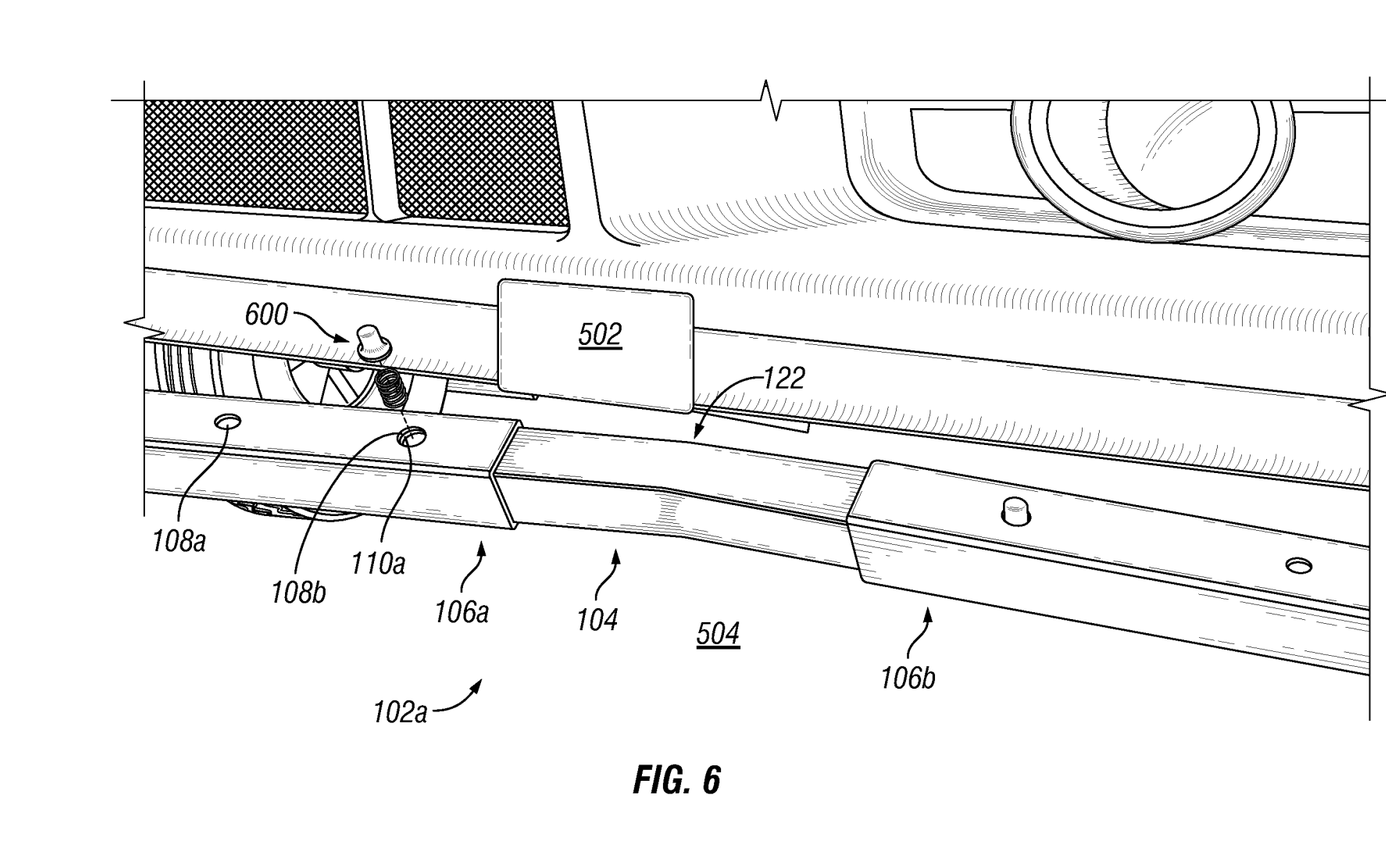
FIG. 6 illustrates a front perspective view of the cross rails shown in FIG. 1, showing the fastening holes and the plunger pins fastening a fix length of the cross rail, in accordance with an embodiment of the present invention.

As FIG. 6 illustrates, the assembly 100 also provides one or more plunger pins operable to pass through the male and female fastening holes when aligned. In one non-limiting embodiment, the plunger pins 600 comprise a spring-loaded plunger. The plunger pins pass through the male and female fastening holes when aligned. This secures the male and female bars 106a-b at a fixed length relative to each other and sets the cross rail 102a-b at an appropriate length for supporting differently sized and styled vehicles.

Suitable materials for the female bars 106a-b may include, without limitation, aluminum, steel, iron, metal alloys, carbon fiber, polymers, and combinations thereof. In some embodiments, the female bars 106a-b are fabricated from the same material as the center male bar 104. In other embodiments, the female bars 106a-b may be fabricated from a stronger material to enable impact absorption capabilities.

Looking now at FIG. 7, the assembly 100 also provides a pair of support tubes 114a, 114b that are disposed in a parallel spaced apart relationship. The support tubes join to the outer end of the female bars 106a-b at an orthogonal, or close to a 90° in relation to each other. The support tubes 114a-b can include elongated metal cylinders or shafts that reinforce stability and integrity of the assembly 100. In some embodiments, the outer end 300b of the female bars 106a-b comprises a mount plate 120a-b that serves to enhance the attachment between the female bars 106a-b and the support tubes 114a-b. The mount plates 120a-b are slightly angled outward at the top to improve the positive camber characteristic of the cross rail.

Continuing with the tow dolly components, a spindle and bushing subassembly 116 joins with the junction between the support tubes and the female bars 106a-b. The spindle and bushing subassembly 116 is configured to facilitate rotation of the dolly tires 118a-d. Various bolts, fastening mechanisms, welds, and other mechanical assemblage means known in the art may also be used to connect the female bars to the support tubes, mount plate, and spindle and bushing subassembly 116.

Figure 8:
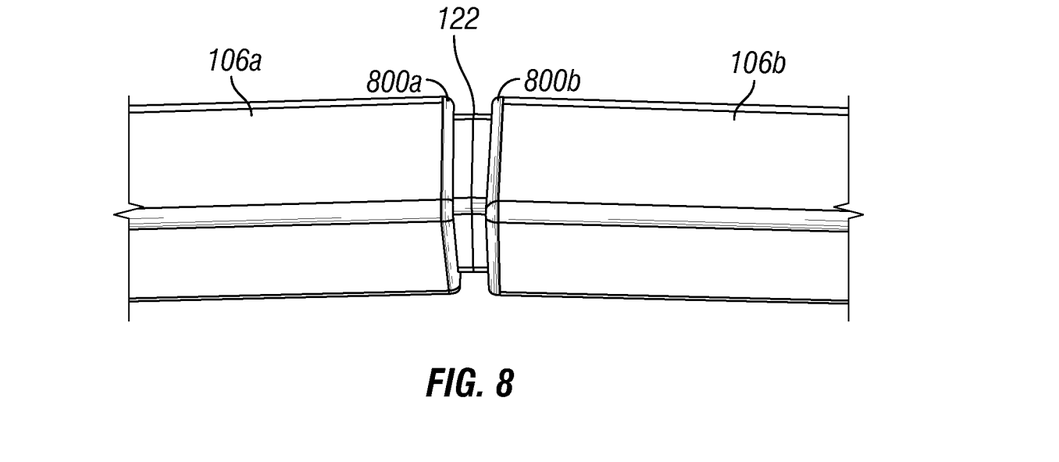
FIG. 8 illustrates a close-up view of a pair of greaseless-bearing inserts coupled to the female bars, in accordance with an embodiment of the present invention.

Turning to FIG. 8, the assembly 100 also provides a pair of greaseless-bearing inserts 800a, 800b that couple to the outer end 300b of the female bars 106a-b. The greaseless-bearing inserts 800a-b can prevent debris from entering the interior of the female bars 106a-b and the center male bar 104. The greaseless-bearing inserts 800a-b also allow smoother sliding during adjustment of the female bars 106a-b. The greaseless-bearing inserts 800a-b also keep the female bars 106a-b centered to the center male bar. In some embodiments, the greaseless-bearing inserts 800a-b may have a square shape, and rest flush against the end of the female bars 106a-b.

Looking back at FIG. 5, the assembly 100 comprises a plurality of dolly tires 118a-d that are rotatably joined with the spindle and bushing subassembly 116. This may include two front dolly tires 118a, 118b and/or two rear dolly tires 118c, 118d. The spindle and bushing subassembly 116 facilitate rotation of the dolly tires 118a-d. It is the positive camber 500 of the dolly tires that creates the advantages for the assembly 100.

Thus, the downward sloped configuration of the female bars 106a-b relative to the horizontal plane 302 orients the dolly tires at a positive camber 500. The sloped configuration is a result of the apex 122 at the center male bar 104. The apex 122 forms an angle 204 in the center male bar 104. The angle 204 is oriented upwardly and away from a ground surface 504. In one non-limiting embodiment, the angle 204 formed in the center male bar 104 is between about 165° to 179°. This creates a slight downward slope at the female bars 106a-b that, in turn, orients the dolly tires to a positive camber 500.

Referring again to FIG. 1 a further advantage of the invention is provided. Specifically, curved or angled tread plates 130a, 130b which are attached to female bars 106a-b. The treaded plates 130a-b help lift and support vehicle tires better because they slide farther under the tires as a result of the low-angle approach to the tire tread. Those skilled in the art will appreciate the importance of being able to lift vehicles with undersized or flat tires.

Figure 9:
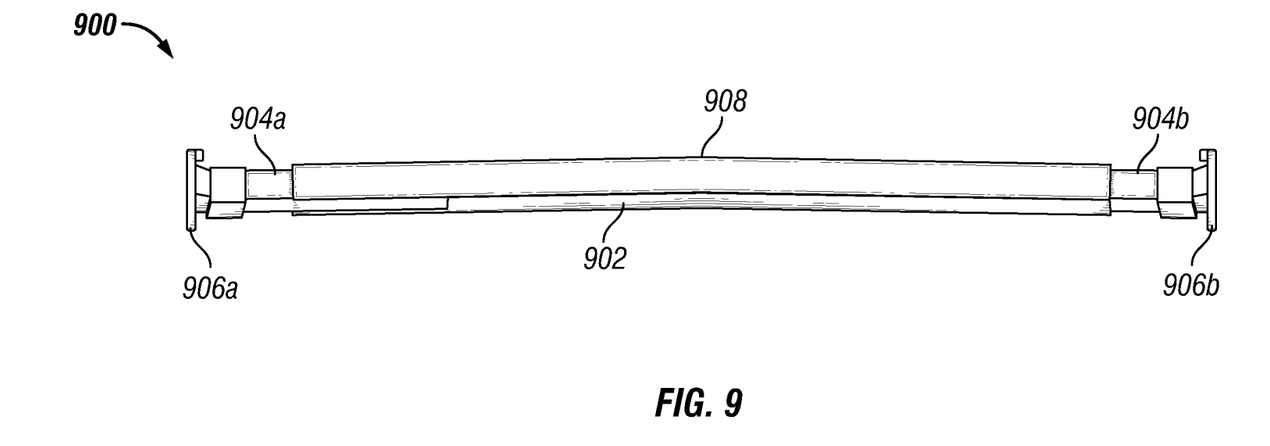
FIG. 9 illustrates a perspective view of an alternative positive cambered cross rail, showing the center female bar with a larger diameter than the two outer male bars, and the center female bar slidably receiving the outer male bars, in accordance with an embodiment of the present invention.

Turning now to FIG. 9, in an alternative embodiment of the present invention, a cross rail utilizes a center female bar 902 that has a larger diameter than a pair of outer male bars 904a, 904b. For example, FIG. 9 illustrates the alternative positive cambered cross rail 900, showing the center female bar 902 with a larger diameter than the male bars 904a, 904b. The center female bar 902 slidably receives the male bars 904a-b to adjust the length of the cross rail 900. Nonetheless, even in the alternative configuration, the center female bar 902 has the arched configuration forming an apex 908 that is oriented upwardly to create the positive camber effect on the dolly tires.

Figure 10:
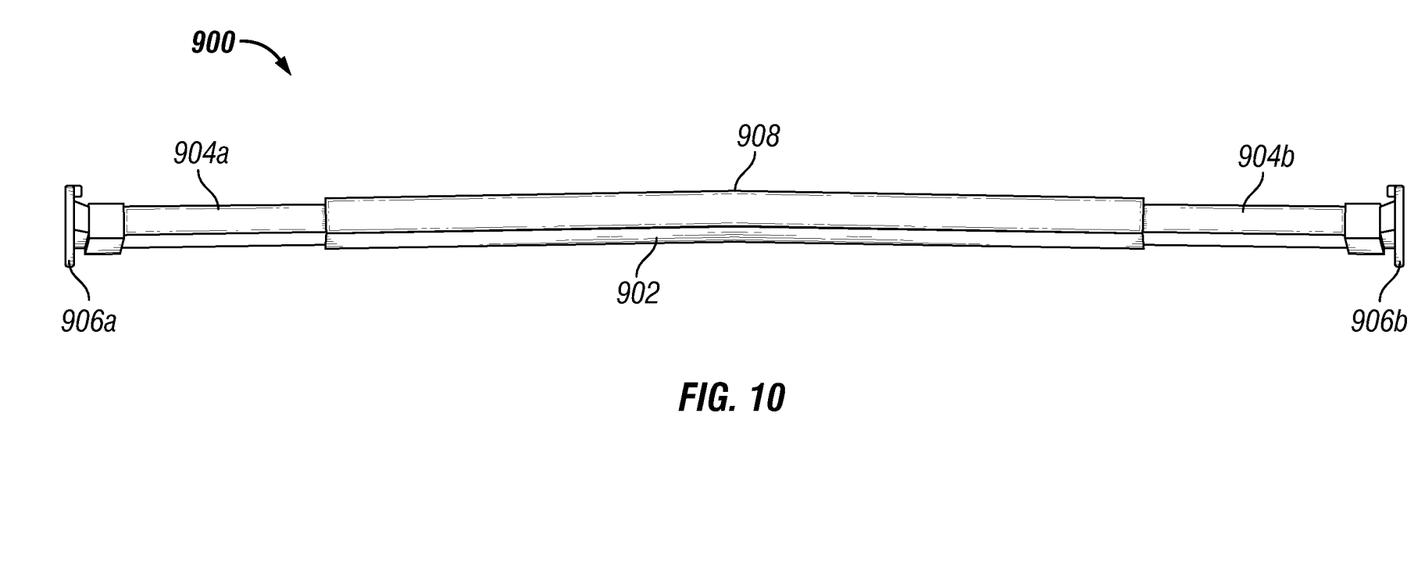
FIG. 10 illustrates the alternative center female bar having the arched configuration, in accordance with an embodiment of the present invention.

FIG. 10 shows another view of the cross rail 900 partially extended to support the weight of the vehicle 202. Also shown is an alternative center female bar 902, rather than a center male bar. The alternative female center bar 902 is defined by an arched configuration. FIG. 10 illustrates the alternative male bars 904a-b slidably joined with the center female bar 902, and having a pair of outward-angled mounting plates 906a, 906b at their ends for attachment to the support tubes of the tow dolly.

Figure 11:
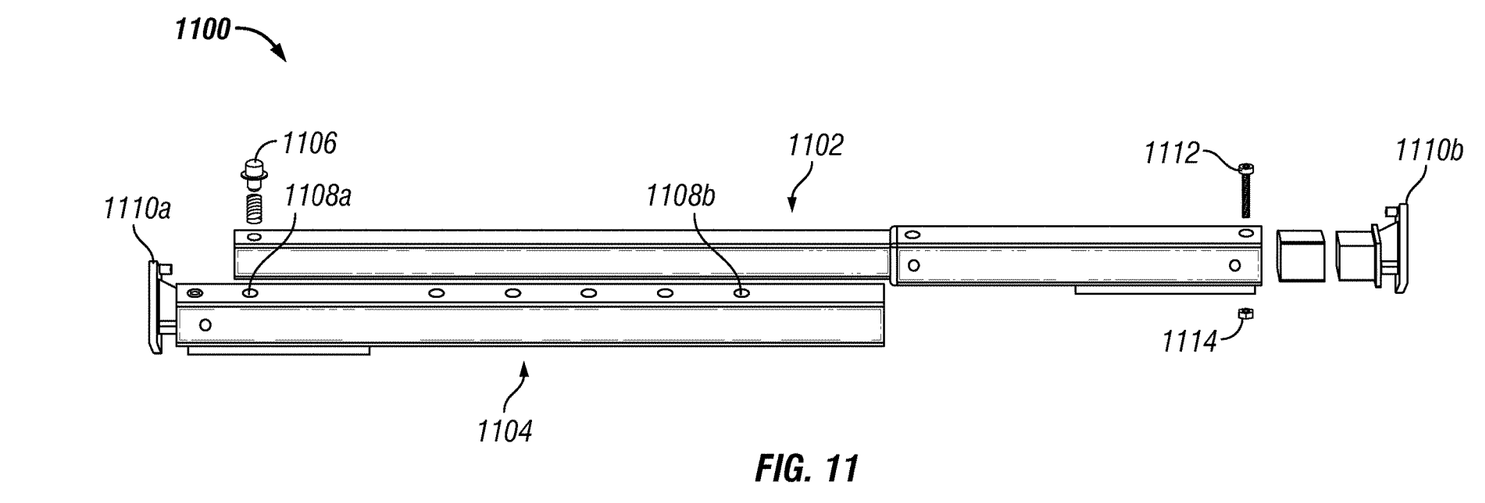
FIG. 11 illustrates a front perspective view of an alternative version of the assembly, showing a linear tow dolly cross rail assembly with no bend in a male bar, in accordance with an embodiment of the present invention.

The present invention is unique in providing alternative embodiments of the cross rail. The alternative embodiments may utilize straight male and/or female bars that do not have arcs, or connect together through different mechanisms. For example, FIG. 11 shows a linear tow dolly cross rail assembly 1100 there is no bend in a male bar 1102. The male bar 1102 may include a cambered aluminum male bar. A female bar 1104 also does not exhibit an arc. The female bar 1104 may include a 6-hole aluminum female bar.

In some embodiments of the assembly 1100, the male bar 1102 utilizes a spring-loaded plunger pin 1106 that corresponds with the various adjustment holes 1108a, 1108b in the female bar 1104. The spring-loaded plunger pin 1106 is similar to pin 600 in FIG. 6, being biased to disengage from the adjustment holes 1108a-b when released. This slidable relationship between the male and female bars 1102, 1104 allows for narrow and wide adjustments in smaller and larger vehicles. The assembly also has a pair of zinc plated rail ends 1110a, 1110b to connect to the dolly tires. A stainless steel rail-end bolt 1112 and a nylon jam nut 1114 may be used to fasten the rail ends 110a-b. In any case, no arc is exhibited in either the male and female bars 1102, 1104, as the bars are straight.

Figure 12:
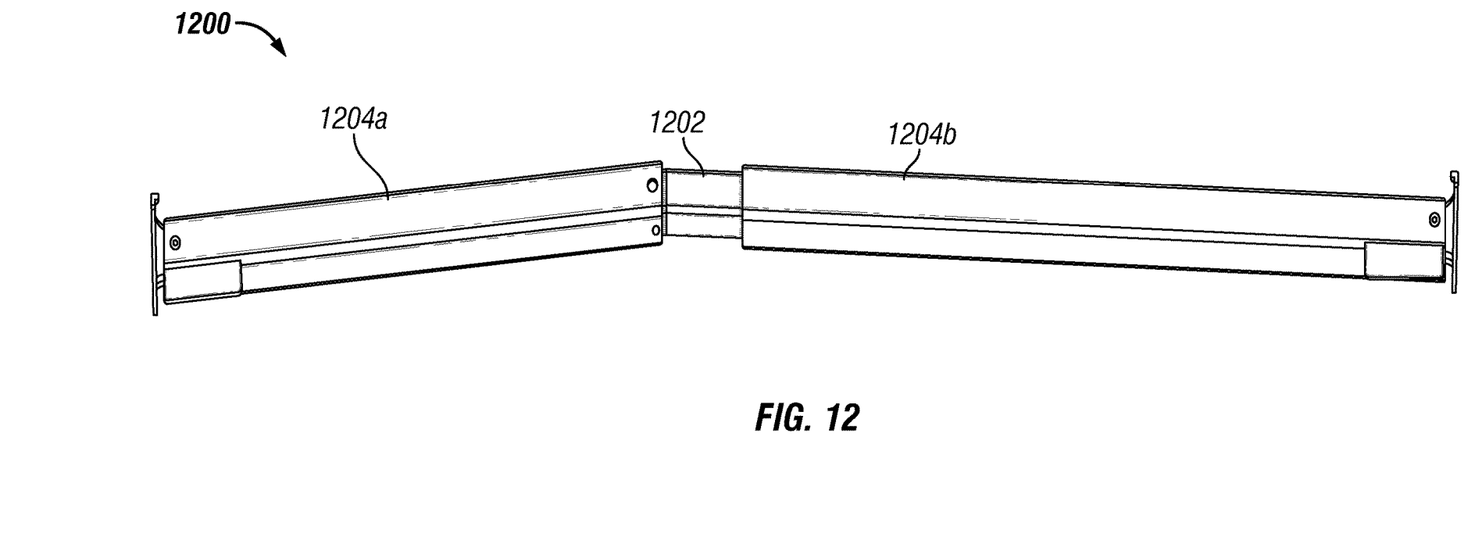
FIG. 12 illustrates a front perspective view of an alternative version of the assembly, showing an arced male bar slidably coupled to female bars, in accordance with an embodiment of the present invention.
Figure 13:
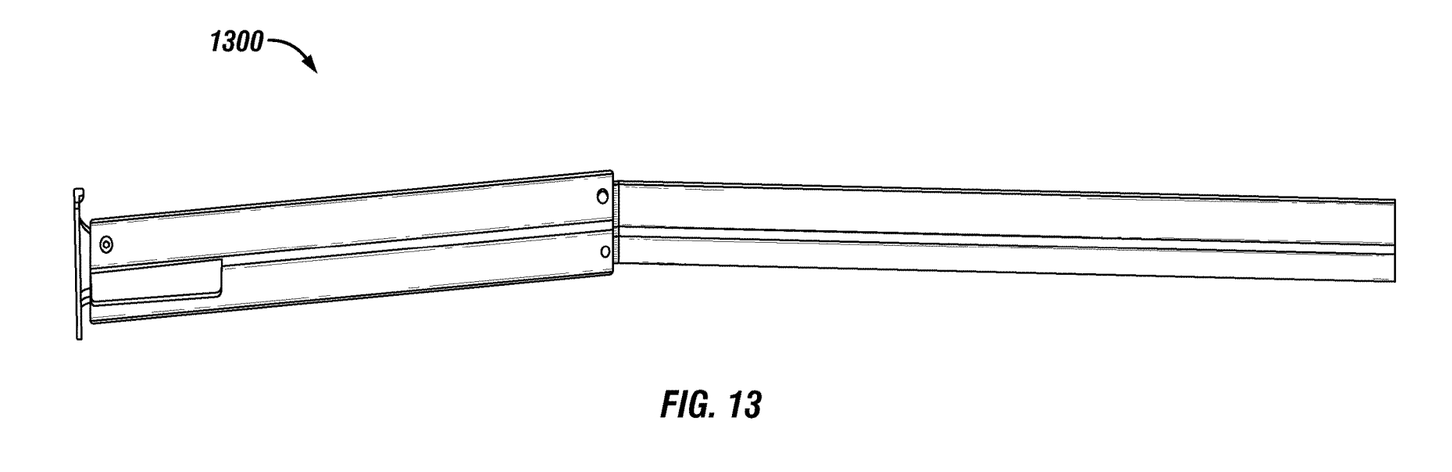
FIG. 13 illustrates a front perspective view of an alternative version of the assembly, showing a male bar only, with a positive camber, in accordance with an embodiment of the present invention.
Figure 14:
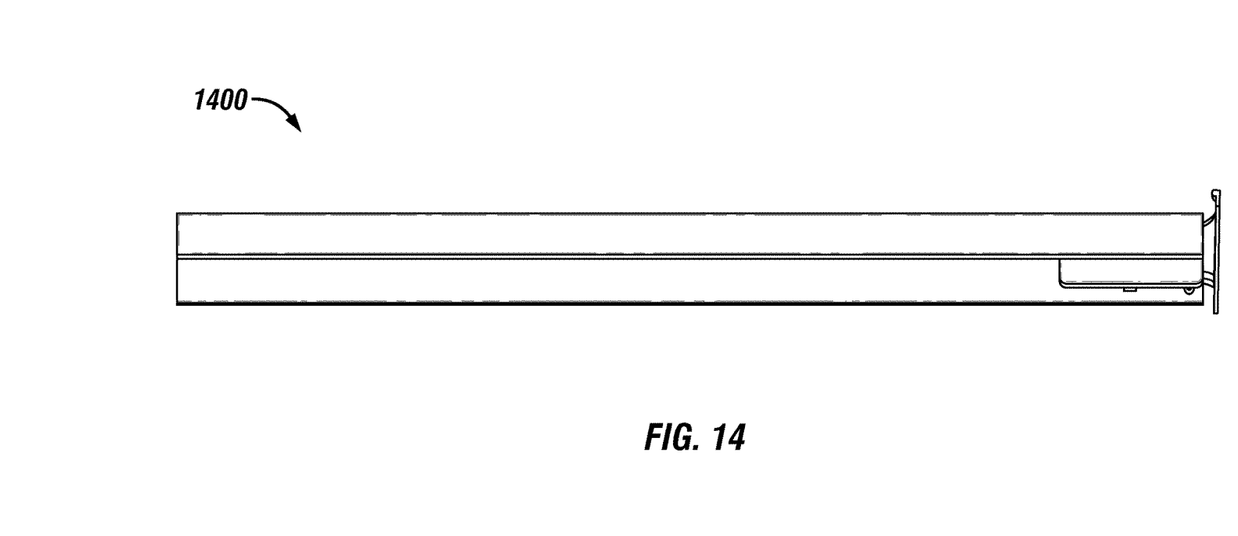
FIG. 14 illustrates a front perspective view of an alternative version of the assembly, showing a female bar, which slides telescopically on the male bar, in accordance with an embodiment of the present invention.

Turning now to an alternative embodiment in FIG. 12, a standard cross rail assembly 1200 illustrates a male bar 1202 slidably coupled to female bars 1204a, 1204b. The bars 1202, 1204a-b from an arc that creates the positive-camber along the cross rail, giving both ends the desired downward angle. FIG. 13 references a male bar 1300 only, with a positive camber. Finally, FIG. 14 shows a female bar 1400, which slides telescopically on the male bar 1300 to enable formation of the narrow and wide adjustments against the vehicle.

In conclusion, a tow dolly cross rail assembly 100 comprises a center male bar 104 and a pair of female bars 106a-b arranged in a slidable relationship. The center male bar 104 forms an arched configuration that creates a positive camber 500 effect at a pair of dolly tires 118a-b at the outer ends of the female bars. The male bar comprises an apex that forms an angle that orients upwardly, forming an angle between about 165° to 179°.

Continuing, the center male bar 104 and the pair of female bars 106a-b are arranged in a slidable relationship with each other. The midpoint of the center male bar forms an apex. The inner end of the female bars is in slidable relationship with free ends of center male bar. The female bars telescopically slide along the free ends of the center male bar for increasing and decreasing length of cross rail 102a-b. The arched configuration of center male bar 104 slopes the female bars 106a-b downward to create a positive camber 500 configuration at the dolly tires 118a-d.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A tow dolly cross rail assembly with positive camber, the assembly comprising:
    at least one cross rail having:
        a center male bar defined by a longitudinal and a pair of free ends, the approximate midpoint of the center male bar forming an apex along the longitudinal of the center male bar,
        whereby the center male bar is defined by an arched configuration;
        a pair of female bars defined by an inner end and an outer end, the inner end of the female bars disposed in a slidable arrangement with the free ends of the center male bar; and
        a pair of support tubes disposed in a parallel spaced apart relationship, and joined at an orthogonal to the outer end of the female bars,
        whereby the female bars telescopically slide along the free ends of the center male bar for selectively increasing and decreasing length of the cross rail,
        whereby the arched configuration of the center male bar slopes the female bars, relative to a horizontal plane.

2. The assembly of claim 1, wherein the at least one cross rail comprises a front cross rail and a rear cross rail.

3. The assembly of claim 1, wherein the center male bar is defined by multiple male fastening holes.

4. The assembly of claim 3, wherein the female bars are defined by multiple female fastening holes.

5. The assembly of claim 4, further comprising one or more plunger pins operable to pass through the male and female fastening holes when aligned.

6. The assembly of claim 5, wherein the plunger pins comprise a spring-loaded plunger.

7. The assembly of claim 1, wherein the female bars are defined by an elongated square shape.

8. The assembly of claim 1, further comprising a pair of greaseless-bearing inserts operatively joined with the inner end of the female bars.

9. The assembly of claim 1, wherein the outer end of the female bars comprises an outward-angled mount plate for attachment to the support tubes.

10. The assembly of claim 1, further comprising a spindle and bushing subassembly joined at the junction of the support tubes and the female bars.

11. The assembly of claim 10, further comprises a plurality of dolly tires rotatably joined with the spindle and bushing subassembly.

12. The assembly of claim 11, wherein the spindle and bushing subassembly facilitate rotation of the dolly tires.

13. The assembly of claim 11, wherein the sloped configuration of the female bars relative to the horizontal plane orients the dolly tires at a positive camber.

14. The assembly of claim 1, wherein the apex forms an angle in the center male bar, the angle oriented upwardly and away from a ground surface.

15. The assembly of claim 14, wherein the angle formed in the center male bar being between about 165° to 179°.

16. The assembly of claim 1, wherein the arched configuration of the center male bar slopes the female bars, relative to a horizontal plane.

17. A tow dolly cross rail assembly with positive camber, the assembly comprising:
- at least one cross rail having:
- a center male bar defined by a longitudinal and a pair of free ends, the approximate midpoint of the center male bar forming an apex along the longitudinal of the center male bar, the apex forming an angle in the center male bar, the angle oriented upwardly, away from a ground surface, the center male bar further being defined by multiple male fastening holes,
- whereby the center male bar is defined by an arched configuration;
- a pair of female bars defined by an inner end and an outer end, the inner end of the female bars disposed in a slidable arrangement with the free ends of the center male bar, the female bars further being defined by multiple female fastening holes,
- whereby the female bars telescopically slide along the free ends of the center male bar for selectively increasing and decreasing length of the cross rail,
- whereby the arched configuration of the center male bar slopes the female bars downward, relative to a horizontal plane;
- a pair of greaseless-bearing inserts operatively joined with the inner end of the female bars;
- a pair of support tubes disposed in a parallel spaced apart relationship, and joined at an orthogonal to the outer end of the female bars;
- a spindle and bushing subassembly joined at the junction of the support tubes and the female bars; and
- a plurality of dolly tires rotatably joined with the spindle and bushing subassembly,
- whereby the downward sloped configuration of the female bars relative to the horizontal plane orients the dolly tires at a positive camber.

18. The assembly of claim 17, wherein the angle formed in the center male bar is between about 165° to 179°.

19. A tow dolly cross rail assembly with positive camber, the assembly consisting of:
- at least one cross rail having:
- a center male bar defined by a longitudinal and a pair of free ends, the approximate midpoint of the center male bar forming an apex along the longitudinal of the center male bar, the apex forming an angle in the center male bar, the angle oriented upwardly and away from a ground surface, the angle formed in the center male bar comprising an angle between about 165° to 179° the center male bar further being defined by multiple male fastening holes,
- whereby the center male bar is defined by an arched configuration;
- a pair of female bars defined by an inner end and an outer end, the inner end of the female bars disposed in a slidable arrangement with the free ends of the center male bar, the female bars further being defined by multiple female fastening holes,
- whereby the female bars telescopically slide along the free ends of the center male bar for selectively increasing and decreasing length of the cross rail,
- whereby the arched configuration of the center male bar slopes the female bars downward, relative to a horizontal plane;
- one or more spring-loaded plunger pins operable to pass through the male and female fastening holes when aligned;
- a pair of greaseless-bearing inserts operatively joined with the inner end of the female bars;
- a pair of support tubes disposed in a parallel spaced apart relationship, and joined at an orthogonal to the outer end of the female bars;
- a spindle and bushing subassembly joined at the junction of the support tubes and the female bars; and
- a plurality of dolly tires rotatably joined with the spindle and bushing subassembly,
- whereby the downward sloped configuration of the female bars relative to the horizontal plane orients the dolly tires at a positive camber.

\* \* \* \* \*